(12) United States Patent
Derrien et al.

(10) Patent No.: US 9,725,201 B2
(45) Date of Patent: Aug. 8, 2017

(54) STACKABLE CONTAINER INCLUDING A SHOULDER WITH THREE STABLE POSITIONS

(71) Applicant: SIDEL PARTICIPATIONS, Octeville sur Mer (FR)

(72) Inventors: Mikael Derrien, Octeville sur Mer (FR); Francois Leterc, Octeville sur Mer (FR); Laurent Penet, Octeville sur Mer (FR); Pierrick Protais, Octeville sur Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 14/406,450

(22) PCT Filed: Jun. 6, 2013

(86) PCT No.: PCT/FR2013/051288
§ 371 (c)(1),
(2) Date: May 4, 2015

(87) PCT Pub. No.: WO2013/186463
PCT Pub. Date: Dec. 19, 2013

(65) Prior Publication Data
US 2015/0298847 A1    Oct. 22, 2015

(30) Foreign Application Priority Data

Jun. 15, 2012    (FR) ...................................... 12 55648

(51) Int. Cl.
*B65D 1/02* (2006.01)
*B65D 21/02* (2006.01)
(Continued)

(52) U.S. Cl.
CPC .......... *B65D 1/0207* (2013.01); *B29D 22/003* (2013.01); *B65D 1/023* (2013.01); *B65D 21/0231* (2013.01); *B65D 79/005* (2013.01)

(58) Field of Classification Search
CPC ........ B65D 1/0207; B65D 1/02; B65D 11/18; B65D 21/086
(Continued)

(56) References Cited

U.S. PATENT DOCUMENTS 2,517,457 A *  8/1950  Allen ...................... A61J 9/005
                                                       215/11.3
5,206,037 A     4/1993  Robbins, III
(Continued)

FOREIGN PATENT DOCUMENTS

EP    0 618 142 A2    10/1994
FR    2 778 167 A1    11/1999
(Continued)

OTHER PUBLICATIONS

International Search Report of PCT/FR2013/051288 dated Mar. 11, 2014 [PCT/ISA/210].

*Primary Examiner* — Anthony Stashick
*Assistant Examiner* — Raven Collins
(74) *Attorney, Agent, or Firm* — Sughrue Mion, PLLC (57) ABSTRACT

Container (1), obtained by blow molding or stretch blow molding of a blank made of plastic material, which comprises a body (2), a shoulder (3) in the extension of the body (2) at an upper end thereof, and a neck (4) in the extension of the shoulder (3), the shoulder (3) being articulated between two stable positions, namely a deployed position in which the shoulder (3) projects from the body (2), and a retracted position in which the shoulder (3) is at least partially retracted into the body (2), the shoulder (3) being articulated in order to be able to adopt, in addition to the
(Continued)

deployed position and the retracted position, a third stable position, intermediate between the deployed position and the retracted position.

15 Claims, 5 Drawing Sheets (51) Int. Cl.
    *B65D 79/00*          (2006.01)
    *B29D 22/00*          (2006.01)

(58) Field of Classification Search
    USPC .... 215/40, 47, 900, 381; 206/752, 751, 762; 220/666; 264/534
    See application file for complete search history.

(56) References Cited

U.S. PATENT DOCUMENTS

| | | | |
|---|---|---|---|
| 8,534,478 B2* | 9/2013 | Mays, III | B65D 21/0231 215/381 |
| 2006/0260971 A1 | 11/2006 | Rivera et al. | |
| 2007/0114200 A1 | 5/2007 | Lane | |
| 2008/0264892 A1* | 10/2008 | Nozawa | B65D 1/023 215/40 |

FOREIGN PATENT DOCUMENTS

| | | |
|---|---|---|
| FR | 2 782 499 A1 | 2/2000 |
| WO | 2007/127337 A2 | 11/2007 |
| WO | 2009/027224 A2 | 3/2009 |

* cited by examiner

STACKABLE CONTAINER INCLUDING A SHOULDER WITH THREE STABLE POSITIONS

The invention relates to containers, and more particularly to stackable containers, comprising to that end a bottom and a neck that are substantially complementary, so as to allow their mutual interlocking.

The production of stackable containers has a long history. American U.S. Pat. No. 2,077,027 describes a stackable container that comprises a body and a shoulder in the shape of a truncated cone mounted on and attached to the body by a folded edge.

The stacking of this type of container is naturally stable, but this stability relies in large part on the material (metal) of which the container is manufactured.

It is difficult to obtain such stability when the container is obtained by blow molding (or stretch blow molding) of a blank (particularly a preform) made of plastic material such as PET (polyethylene terephthalate). Indeed, not only are plastic materials naturally malleable, but the demands of the market also tend toward production of containers that are increasingly lighter.

The document EP 0 698 557 describes a stackable container made of plastic, the bottom of which is shaped substantially complementary to the neck in order to allow stacking. To that end, the bottom and the shoulder of the container are fitted with flat support surfaces on their periphery, and the bottom is also provided with a hollow portion for receiving the neck of a subjacent container.

The manufacture of such a container, in order to produce the bottom, requires a substantial quantity of material necessary to give the bottom sufficient rigidity, capable of giving the container as a whole good mechanical strength and good stability during its stacking. Moreover, a sufficient quantity of material is necessary for the good blowability the bottom (that is, its capability of being formed correctly). On the contrary, a careless lightening of the container, particularly at the bottom, is detrimental to the mechanical strength of the container and to the stability of its stacking.

As can be seen, it is difficult to obtain a good compromise between stacking stability and the lightness of a container made of plastic.

Nevertheless, that is the objective sought by the invention.

To that end, a container is proposed, obtained by blow molding or stretch blow molding of a blank made of plastic material, which comprises a body, a shoulder in the extension of the body at an upper end thereof, and a neck in the extension of the shoulder, the shoulder being articulated between two stable positions, namely a deployed position in which the shoulder projects from the body, and a retracted position in which the shoulder is at least partially retracted into the body, the shoulder being articulated in order to be able to adopt, in addition to the aforementioned two stable positions, a third stable position, intermediate between them, the shoulder comprising a peripheral section and a central section, a first articulation being defined at a junction between the peripheral section and the body, a second articulation being defined at a junction between the peripheral section and the central section, the peripheral section and the body defining at their junction an axially projecting ridge, a third articulation being defined by the junction between the central section and a section beneath the neck, the bottom of the container comprising at its center a vault defining a hollow reserve and, at its periphery, an inset that is complementary to the ridge.

Of course, containers with movable shoulders are known—see for example European patent EP 1 870 345 and the international application WO 02/38360—but these involve welded flat-bottom tubes that are to be placed in a standing position turned over, which allows a completely retracted position of the shoulder.

In this instance, the problem is very different since it involves enabling a stable stacking of the container. The retracted position in which the stack can be made makes it possible to decrease the shoulder height, and consequently the receiving space made in the bottom. It is therefore possible to reduce the amount of material necessary to form the bottom, which makes it possible to lighten the container without sacrificing stability.

Moreover, the shoulder can be placed in its retracted position after filling and capping, which places the contents under pressure and increases the rigidity of the container. The result is increased stability of stacking.

Various additional characteristics can be considered, alone or in combination:
- in the intermediate position, the peripheral section and the central section extend respectively downwards and upwards;
- in the retracted position, the peripheral section and the central section extend downwards;
- in the deployed position, the peripheral section and the central section extend upwards;
- in the retracted position, the neck does not extend beyond the ridge or partially extends beyond it;
- in the intermediate position, the neck extends completely beyond the ridge;
- in the retracted position, the neck partially extends beyond the ridge and the vault has a shape and dimensions such that, when two containers are stacked, said reserve is capable of receiving the part of the neck that partially extends beyond the ridge of the subjacent container when its shoulder is in said retracted position;
- the body is curved in the vicinity of the shoulder;
- the body is provided with at least one deformable zone;
- the body is stiff except for the deformable zone or zones;
- the body has a superposition of annular stiffeners.

Other objects and advantages of the invention will be seen from the description of a preferred embodiment, provided hereinbelow with reference to the appended drawings in which.

Represented in the figures is a container 1 obtained by blow molding (or stretch blow molding) of a blank of plastic material. Said blank is a preform, for example, but it can also involve an intermediate container having undergone a first transitional blow-molding operation.

The container 1 comprises a body 2, cylindrical in shape, which extends along a principal axis X. The body 2 is not necessarily symmetrical in revolution around its axis X. It could be circular in cross-section, but in the illustrated example, it is square in cross-section (rounded at the corners).

The container 1 also comprises a shoulder 3 in the extension of the body 2 at an upper end thereof, a neck 4 in the extension of the shoulder 3, and a bottom 5 in the extension of the body 2 at a lower end. The neck 4 has, in the vicinity of its junction with the shoulder 3, a collar 6 enabling the blank to be suspended in various stages of manufacturing. Between the collar 6 and the shoulder 3, the container 1 has a section 7 beneath the neck, cylindrical in revolution around the principal axis X, providing sufficient space to receive a device (such as tongs) for gripping the container 1.

As can be seen in the figures, the shoulder 3 comprises a peripheral section 8, in the form of a relatively narrow band of material that extends from an outer edge, which defines a first articulation 9, which is outer, of the shoulder 3 with respect to the body 2, at a junction with the body 2 at the upper end thereof up to a concentric inner edge of the outer edge, which inner edge defines a second articulation 10, which is inner, of a central section 11 of the shoulder 3 with respect to the peripheral section 8.

The central section 11 of the shoulder 3 is in the shape of a truncated cone and extends from the inner articulation 10 of the peripheral section 8 to the section 7 beneath the neck.

The junction between the central section 11 of the shoulder 3 and the section 7 beneath the neck defines a third articulation 12, which is central, of the shoulder 3 with respect to the neck 4.

Figure 3:
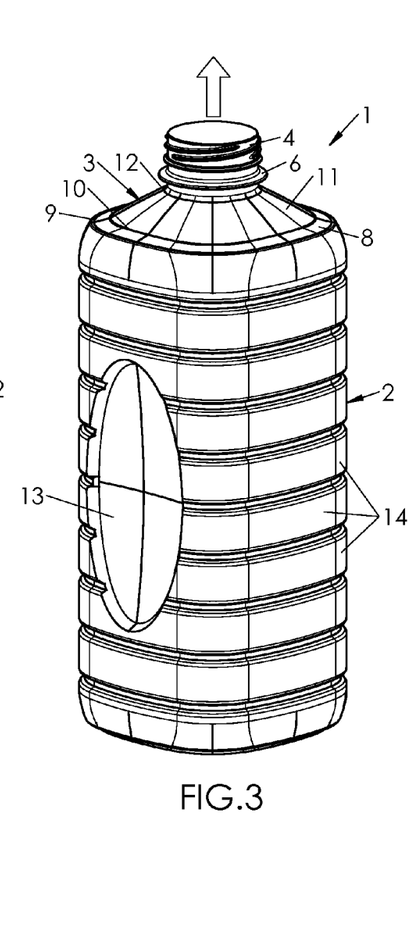
FIG. 3 is a view similar to FIGS. 1 and 2, showing the container with the shoulder in a deployed position.
Figure 8:
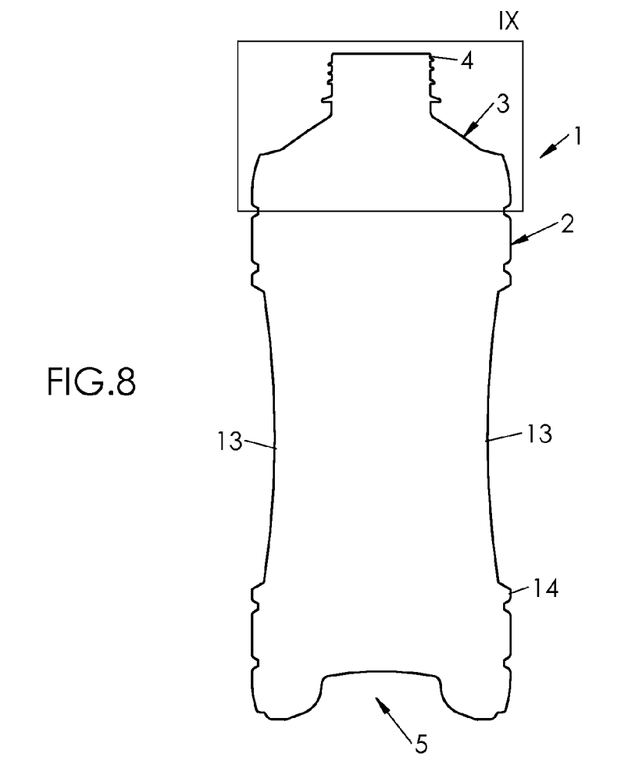
FIG. 8 is a cross-sectional view of the container with the shoulder in the deployed position.
Figure 9:
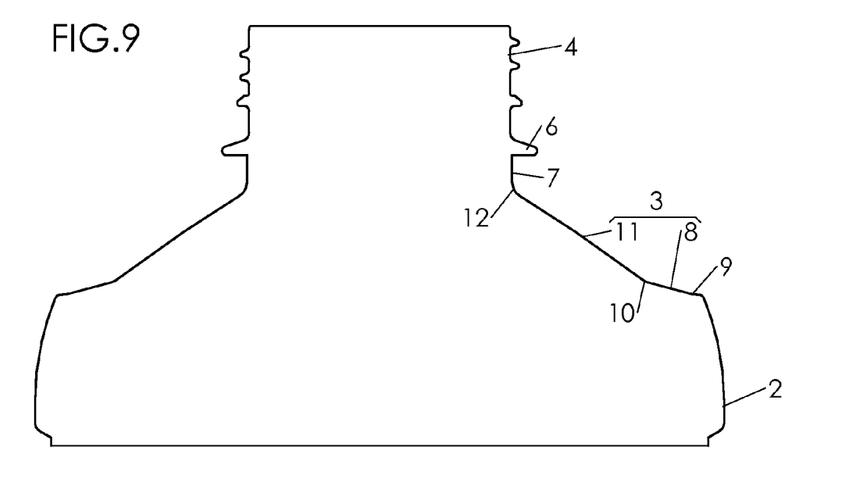
FIG. 9 is a detailed view of the shoulder of the container according to inset IX in FIG. 8.

Said articulations 9, 10, 12 give the shoulder 3 the ability to adopt three stable positions:

a retracted position (FIGS. 2, 6, 7, 10) in which the shoulder 3 is at least partially inserted into the body 2, the peripheral section 8 and the central section 11 both extending downwards, that is, their conicity points toward the bottom 5 (downwards);

a deployed position (FIGS. 3, 8, 9) in which the shoulder 3 projects from the body 2, the peripheral section 8 and the central section 11 both extending upwards, that is, their conicity points towards the neck 4 (upwards);

an intermediate position (FIG. 1) between the retracted position and the deployed position, the peripheral section 8 extending downwards (that is, its conicity points downwards) while the central section 11 extends upwards (that is, its conicity points upwards).

The intermediate position (FIG. 1) is just after forming. In other words, it is in this position that the container 1 is formed. It is also in this position that the container 1 is filled and capped.

Figure 2:
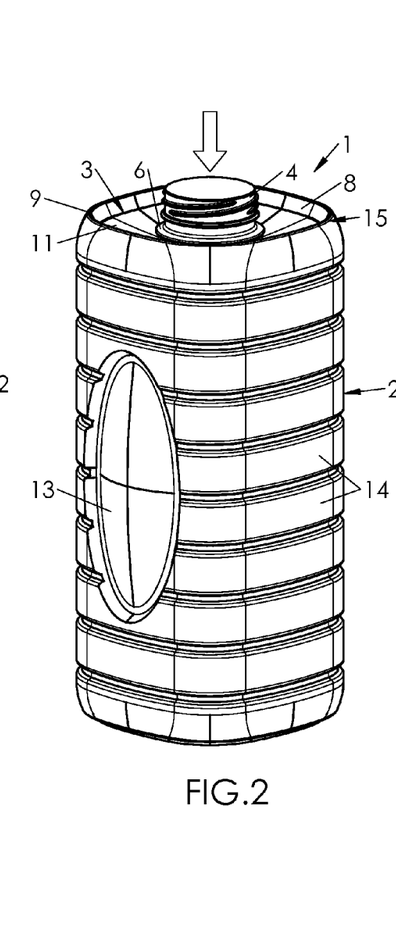
FIG. 2 is a view similar to FIG. 1, showing the container with the shoulder in a retracted position.

Starting from said intermediate position, and once the container 1 has been filled and capped, the shoulder 3 is placed in the retracted position (by mechanical means), as suggested by the arrow in FIG. 2.

The transition of the shoulder 3 from the intermediate position to the retracted position is achieved by rotating the central section 11 around the inner articulation 10, while the orientation of the peripheral section 8 remains substantially unchanged and the neck 4 is moved in an axial piston movement directed downwards, enabled by a pivoting of the central section 11 with respect to the neck 4 around the central articulation 12.

When the container 1 is filled, the retraction of the shoulder 3 causes the contents of the container 1 to be placed under pressure. This placing under pressure can be partially or completely compensated. To that end, the body 2 can be provided with at least one deformable zone 13. In the illustrated example, the body 2 is provided with a pair of deformable zones 13 that are diametrically opposite.

Moreover, because the zone 13 or each zone 13 absorbs the deformation due to the differences in pressure inside the container 1, the body 2 (with the exception of possible deformable zones) can be stiffened, as in the illustrated example where the body 2 has a superposition of annular stiffeners 14, to the benefit of the structural rigidity of the container 1 when it is stacked.

Figure 1:
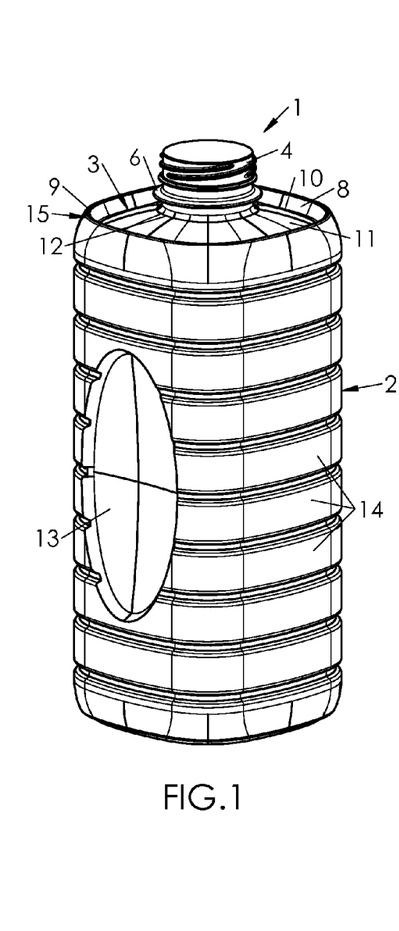
FIG. 1 is a view in perspective illustrating a container in an intermediate position of the shoulder, just after forming.
Figure 4:
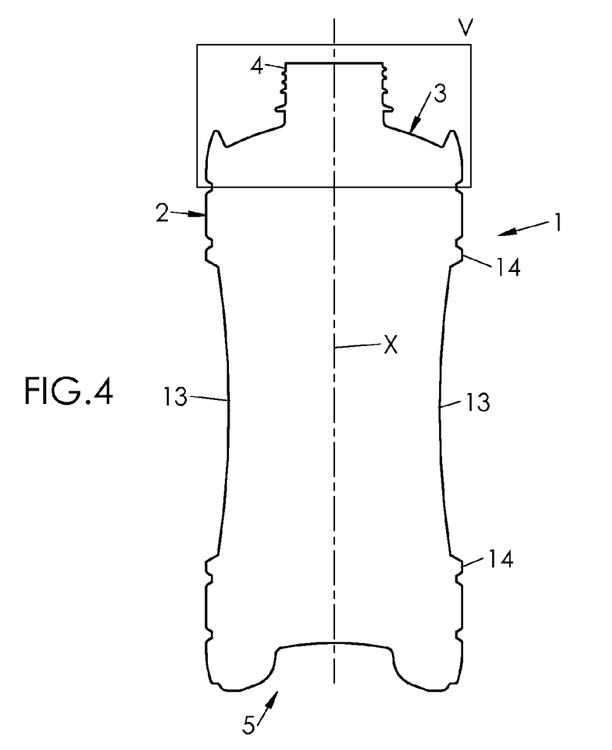
FIG. 4 is a cross-sectional view of the container with the shoulder in the intermediate position.

In this configuration, the container 1 is formed (with the shoulder 3 in the intermediate position) with the zone 13 (or each zone 13) in a flat or possibly hollow configuration, as illustrated in FIGS. 1 and 4.

Figure 6:
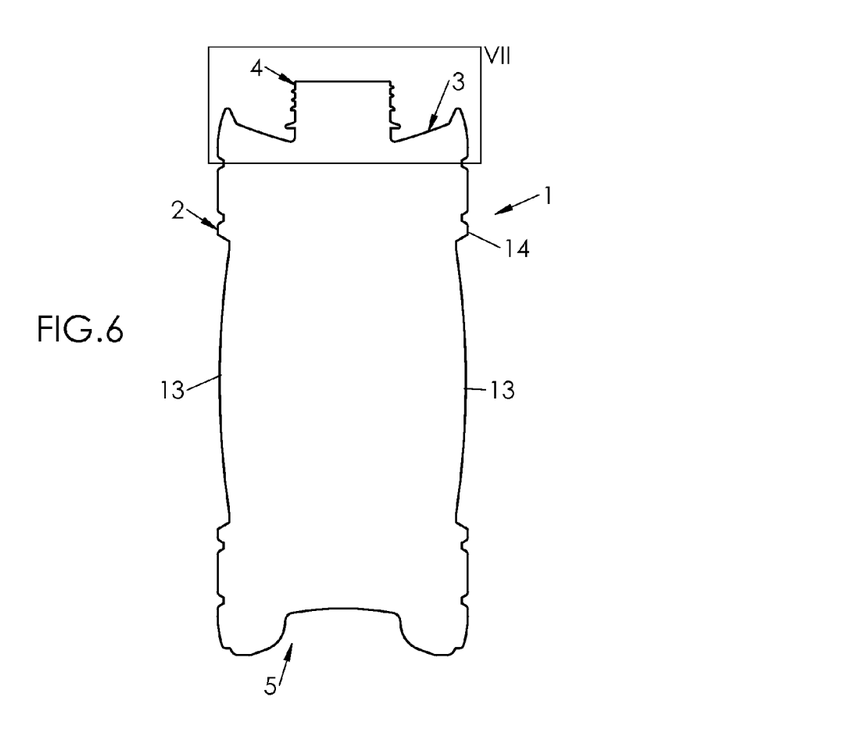
FIG. 6 is a cross-sectional view of the container with the shoulder in a retracted position.

During the retraction of the shoulder 3, the zone 13 is deformed in order to adopt a configuration that is more or less curved outwards from the container 1, as illustrated in FIGS. 2 and 6.

The container 1 is stacked with the shoulder 3 in the retracted position in order to enable its packing (for example, palletizing) and aggregated transport.

Figure 7:
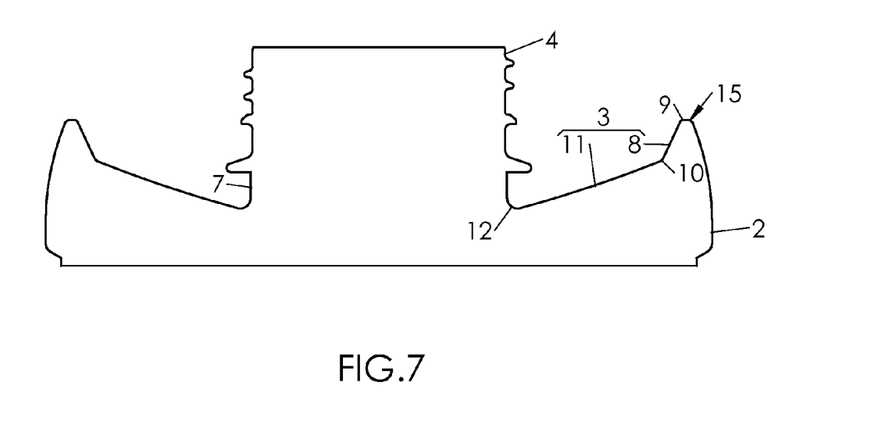
FIG. 7 is a detailed view of the shoulder of the container according to inset VII in FIG. 6.

As can be seen particularly in FIG. 7, the peripheral section 8 and the body 2 define an axially projecting ridge 15 at their junction, that is, at their outer articulation 9.

Figure 10:
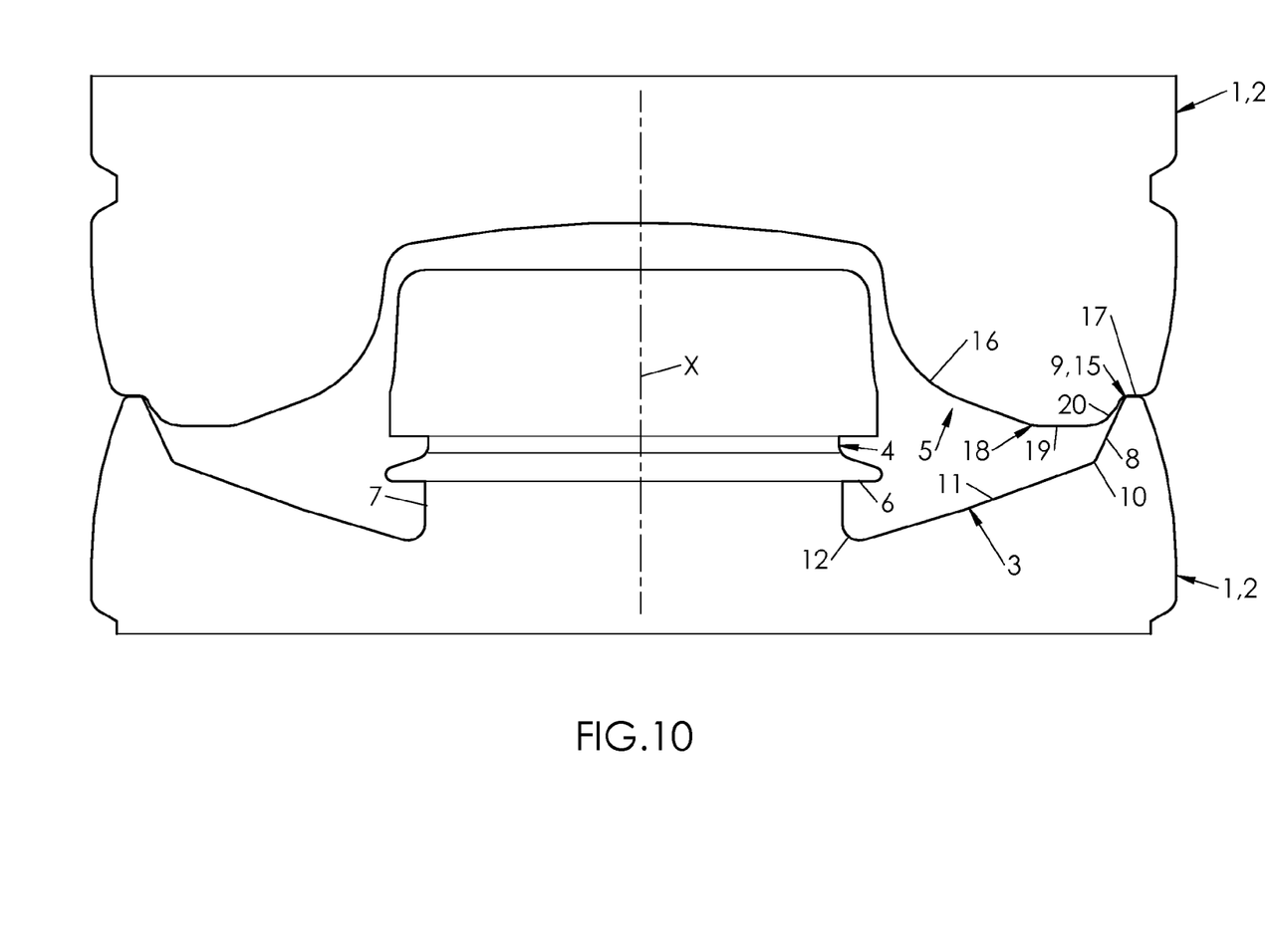
FIG. 10 is a cross-sectional view showing the superposition of two containers, the lower container having the shoulder in the retracted position.

In the retracted position, the neck 4 extends only partially beyond the ridge 15, as illustrated in FIGS. 7 and 10 where the collar 6 is situated below the level of the ridge 15, only an upper part of the neck 4 extending beyond the ridge 15, so that the neck 4 forms a projection of low axial extension beyond the body 2. As a variant, the neck 4 does not extend at all beyond the ridge 15. In such case, the mouth defined by the upper end of the neck 4 is extended below the level of the ridge 15.

As can be seen in the figures, and more specifically in FIG. 10, when the neck 4 partially extends beyond the ridge 15 in the retracted position, the bottom 5 of the container 1 is then adapted to be able to receive the part that extends beyond the ridge 15 of the neck 4 of an identical subjacent container 1 in the retracted position.

More specifically, the bottom 5 has at its center a vault 16 defining a hollow reserve, the shape and dimensions of which are such that it is capable of receiving the part of the neck 4 of a subjacent container partially extending beyond the ridge 15, and at its periphery, an inset 17 that is complementary to the ridge 15 of the subjacent container 1.

In the variant where the neck 4 does not extend at all beyond the ridge 15 in the retracted position, the presence of a hollow reserve capable of receiving a part of the neck 4 of a subjacent container is no longer necessary. Nevertheless, the bottom 5 can still have a vault 16 of smaller dimensions with respect to the previous case, and at its periphery, an inset 17 that is complementary to the ridge 15 of the subjacent container 1, said arrangement enabling the bottom to remain stable when the container 1 is erect.

According to a particular embodiment illustrated in the figures, between the vault 16 and the inset 17, the bottom 5 has an annular seat 18 defining a seating plane 19 enabling the container 1 to be placed upright on a flat support (for example, a table). The seat 18 defines externally a fillet 20 between the inset 17 and the seating plane 19.

Such a configuration of the bottom 5 allows the stacking of the containers 1, as illustrated in FIG. 10. As can be seen in this figure, the container 1 can be fitted onto a subjacent container 1, the ridge 15 of the latter being inserted into the inset 17 of the upper container 1.

The mutual transverse movement of the containers 1 is blocked by the cooperation of the fillet 20 of the upper container 1 in the downward-sloping peripheral section 8 of the subjacent container 1.

Other configurations can be considered to enable the stacking of containers. In particular, the bottom could be configured so as to allow fitting by the exterior of the ridge, and not by the interior as described above.

Because of the low axial projection (or absence of projection) of the neck 4 in the retracted position of the subjacent container 1, the vault 16 has a low axial projection towards the interior of the container 1, to the benefit of substantial savings of material.

Figure 5:
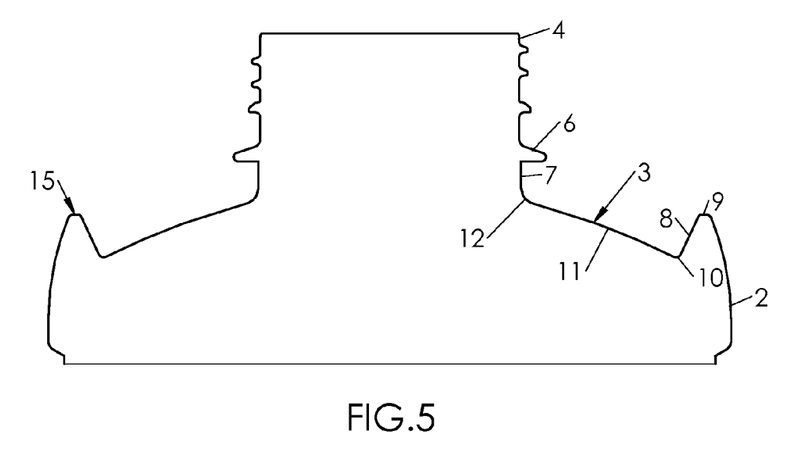
FIG. 5 is a detailed view of the shoulder of the container according to inset V in FIG. 4.

It will be noted, as illustrated in FIG. 5, that in the intermediate position (just after forming), the neck 4 extends completely beyond the ridge 15. More specifically, the collar 6 (but also, in the example shown, the section 7 beneath the neck) extends beyond the ridge 15. This allows the container 1 to be handled by gripping devices that grip the section 7 beneath the neck.

The transition of the shoulder 3 from the retracted position to the deployed position is done by combined rotation of the peripheral section 8 around the outer articulation 9, and of the central section 11 around the inner articulation 10. Thus, the peripheral section 8 pivots with respect to the body 2 around the outer articulation 9; the central section 11 pivots with respect to the peripheral section 8 around the inner articulation 10, and with respect to the neck 4 around the central articulation 12. The neck 4 is driven upwards in an axial piston movement.

Said rotation of the shoulder 3 can be caused by a pressure manually produced by the user on the body 2 of the container 1, for example, when there are deformable zones 13 that, under pressure, change from their convex configuration (adopted in the retracted position of the shoulder 3) to a concave configuration (FIGS. 3 and 8), thus absorbing the low pressure due to the increase in the internal volume of the container 1 resulting from the rotation of the shoulder 3.

The container 1 that has just been described has the following advantages, thanks to the triple position of the shoulder 3.

Firstly, placing the container 1 under pressure due to the change from the intermediate position (just after forming) of the shoulder 3 to the retracted position causes an overpressure that increases the structural rigidity of the container 1 in said second position, to the benefit of the strength of the stacked container 1.

Secondly, as a result of the low projection formed by the neck 4 in the retracted position (used for stacking), the bottom 5 can have a low axial extension, and consequently requires a relatively modest amount of material, thus benefiting the lightness of the container 1.

Thirdly, the ridge 15 offers a solid seat to the upper container 1, and ensures a rigid fitting, thus benefiting the stability of the stack.

Fourthly, the rotation of the shoulder 3 during its deployment makes it possible to increase the usable volume of the container 1. This results in reducing the level of the contents, which minimizes the risk of spill frequently encountered with lightweight containers, due to the pressure exerted by the user on the body when the cap is removed. Moreover, when the neck is threaded, it can be advantageous to channel the threading to accelerate placing the volume below the neck at atmospheric pressure and thus promote the drop in the level of the contents upon opening.

As can be seen in the figures, and more particularly in FIG. 10, the body 2 can be curved (that is, slightly convex towards the interior) in the vicinity of the shoulder 3, and more specifically in the vicinity of the outer articulation 9 (and thus of the ridge 15 in the retracted position). This favors the compressive strength of the subjacent container 1.

The invention claimed is:

1. A container, obtained by blow molding or stretch blow molding of a blank made of plastic material, which comprises a body, a shoulder in the extension of the body at an upper end thereof, and a neck in the extension of the shoulder, the shoulder being articulated between two stable positions, namely a deployed position in which the shoulder projects from the body, and a retracted position in which the shoulder is at least partially retracted into the body, wherein the shoulder is articulated in order to be able to adopt, in addition to the deployed position and the retracted position, a third stable position, intermediate between the deployed position and the retracted position, the shoulder comprising a peripheral section and a central section, a first articulation being defined at a junction between the peripheral section and the body, a second articulation being defined at a junction between the peripheral section and the central section, the peripheral section and the body defining at their junction an axially projecting ridge, a third articulation being defined by the junction between the central section and a section beneath the neck, the bottom of the container comprising at its center a vault defining a hollow reserve and at its periphery an inset that is complementary to the ridge; and wherein the container is configured such that transition of the shoulder from the third stable position to the retracted position is achieved by rotating the central section around the second articulation, while orientation of the peripheral section remains substantially unchanged and the neck is moved axially downwards along a central axis of the container.

2. The container according to claim 1, wherein:
   in the intermediate position, the peripheral section and the central section extend respectively downwards and upwards,
   in the retracted position, the peripheral section and the central section extend downwards, and
   in the deployed position, the peripheral section and the central section extend upwards.

3. The container according to claim 1, wherein:
   in the retracted position, the neck does not extend beyond the ridge or partially extends beyond the ridge, and
   in the intermediate position, the neck extends completely beyond the ridge.

4. The container according to claim 3, wherein, in the retracted position, the neck partially extends beyond the ridge and the vault has a shape and dimensions such that, when two containers are stacked, said reserve is capable of receiving the part of the neck that partially extends beyond the ridge of the subjacent container when the shoulder is in said retracted position.

5. The container according to claim 1, wherein the body is curved in the vicinity of the shoulder.

6. The container according to claim 1, wherein the body is provided with at least one deformable zone.

7. The container according to claim 6, wherein the body is stiff except for the deformable zone or zones.

8. The container according to claim 7, wherein the body has a superposition of annular stiffeners.

9. The container according to claim 1, wherein the neck, shoulder and body remain symmetrical about a central axis of the container in each of the deployed position, the retracted position and the intermediate third stable position.

10. The container according to claim 1, wherein the shoulder assumes a different orientation in each of the deployed position, the retracted position and the intermediate third stable position.

11. The container according to claim 1, configured such that during manufacture of the container, the shoulder is in the intermediate third position during filling and capping.

12. A method of manufacturing the container according to claim 1, comprising the step of maintaining the shoulder in the intermediate third position during filling and capping and then placing the shoulder in the retracted position.

13. A container, obtained by blow molding or stretch blow molding of a blank made of plastic material, comprising:
   a body;
   a neck; and
   a shoulder between the body and the neck, the shoulder having a peripheral section and a central section;
   a first articulation between the peripheral section and the body, allowing the peripheral section to rotate about the first articulation; and
   a second articulation between the peripheral section and the central section, allowing the central section to rotate about the second articulation;
   an axially projecting ridge between the peripheral section and the body; and
   a bottom comprising a vault defining a hollow reserve and an inset that is complementary to the axially projecting ridge; and
   wherein the shoulder is configured to be articulated between the following three positions:
      a deployed position in which the shoulder projects from the body,
      a retracted position in which the shoulder is at least partially retracted into the body, and
      an intermediate position between the deployed position and the retracted position; and
   wherein the first articulation and the second articulation each remains at a respective same location on the container as the container transitions between the retracted position, the intermediate position and the deployed position.

14. The container according to claim 13, wherein a length of the peripheral section and a length of the central section, as measured along a cross-section taken in a plane parallel to a longitudinal axis of container, remain substantially constant as the container transitions between the retracted position, the intermediate position and the deployed position.

15. The container according to claim 13, further comprising a third articulation between the central section and a section beneath the neck.

* * * * *